US005672313A

United States Patent [19]

Shiga et al.

[11] Patent Number: 5,672,313

[45] Date of Patent: Sep. 30, 1997

[54] METHOD OF MANUFACTURING POWDER MOLDING AND POWDER FEEDER

[75] Inventors: Ryuji Shiga; Yoshishige Takano; Yoshinobu Takeda, all of Itami, Japan

[73] Assignee: Sumitomo Electric Industries, Ltd., Osaka, Japan

[21] Appl. No.: 501,066

[22] PCT Filed: Dec. 12, 1994

[86] PCT No.: PCT/JP94/02094

§ 371 Date: Aug. 11, 1995

§ 102(e) Date: Aug. 11, 1995

[87] PCT Pub. No.: WO95/16559

PCT Pub. Date: Jun. 22, 1995

[30] Foreign Application Priority Data

Dec. 13, 1993 [JP] Japan .................................... 5-311701

[51] Int. Cl.$^6$ .................................................... B29C 43/02

[52] U.S. Cl. ............................ 264/460; 264/71; 264/123; 425/174; 425/352; 425/456

[58] Field of Search ................................ 264/71, 72, 109, 264/123, 460; 425/352, 456, 174

[56] References Cited

FOREIGN PATENT DOCUMENTS

| | | |
|---|---|---|
| 1 026 210 | 3/1958 | Germany . |
| 1 136 575 | 9/1962 | Germany . |
| 1 150 307 | 6/1963 | Germany . |
| 60-105510 | 6/1985 | Japan . |
| 61-95800 | 5/1986 | Japan . |
| 2-25537 | 2/1990 | Japan . |
| 685 436 | 9/1979 | U.S.S.R. . |
| 874 004 | 8/1961 | United Kingdom . |
| 89/02820 | 4/1989 | WIPO . |

*Primary Examiner*—Mary Lynn Theisen
*Attorney, Agent, or Firm*—Wenderoth, Lind & Ponack

[57] ABSTRACT

A material powder is packed in a cavity of a mold with high and uniform density to manufacture a powder molding a material powder in a shoe box 12 is fed into a cavity 6 formed in a mold 1 by moving the shoe box 12 over the cavity 6 while oscillating the shoe box until the density of the powder in the cavity increases to at least 1.1 times the apparent density. The powder is then compression-molded.

7 Claims, 4 Drawing Sheets

METHOD OF MANUFACTURING POWDER MOLDING AND POWDER FEEDER

BACKGROUND OF THE INVENTION

1. Field of the Invention

This invention relates to a method of manufacturing a powder molding using a mold for compression molding, and a powder feeder for use in the manufacture of such a power molding.

2. State of the Prior Art

FIG. 6 illustrates a conventional method of manufacturing a powder molding. In this method, a powder molding is manufactured by moving a powder feed shoe box 2 containing powder to a position over a cavity 21 formed in a mold 20 to drop the powder in the box 22 into the cavity 21, backing the shoe box 22, and compressing the powder in the cavity 21 by lowering an upper punch 23.

A powder molding is usually sintered subsequently. If the density of the powder molding is uneven, the dimension of the powder molding tends to be uneven when sintered, so that the sintered product tends to be uneven in dimension, too.

In this conventional method, powder is dropped by gravity into the cavity 21, so that the powder tends to form a bridge in the cavity. This leads to uneven density of the powder.

The powder in the shoe box 22 spontaneously drops into the cavity 21 while moving the shoe box 22 to over the cavity. Then, by backing the shoe box 22, any portion of the powder protruding from the surface of the mold 20 is scraped off by the edge of the shoe box 22, so that the top of the powder in the cavity is leveled out. This causes unevenness in the density of the powder.

In order to make the density of the powder packed in the cavity of the mold uniform, trials were made to vibrate the mold after filling powder in the cavity. But by vibrating the mold, the mold tends to displace or may be worn. If the mold moves, it may be broken by interfering with the upper punch.

Unexamined Japanese Patent Publication 5-69195 discloses a method of feeding powder in which a high-frequency AC current is supplied through a coil surrounding the mold to microscopically oscillate a material powder containing magnetic substances by producing an eddy current in the powder.

But in this method, it is impossible to use a powder other than magnetic powders. Also, an extra space has to be provided around the mold to mount the coil. This leads to reduced rigidity of the die set. Moreover, a magnetic field produced by the coil tends to unnecessarily magnetize the mold and the powder molding. In order to oscillate the powder with a sufficient strength, a high voltage is required. This pushes up the production cost.

SUMMARY OF THE INVENTION

An object of this invention is to provide a method of manufacturing a powder molding which makes it possible to pack a material powder in a cavity of a mold with high and uniform density, and a powder feeder for use in this method.

According to this invention, there is provided a method of manufacturing a powder molding comprising the steps of feeding a material powder into a cavity formed in a mold for compression molding through a bottom opening formed in a shoe box while oscillating the material powder while it is in the shoe box until the density of the powder in the cavity increases to at least 1.1 times the apparent density, and compressing the powder in the cavity.

The powder in the shoe box should preferably be oscillated at an oscillating frequency of 10–200 Hz and an oscillating pressure of 1–50 kg.

The powder feeder for use in the manufacture of a powder molding comprises a shoe box mounted to move toward and away from a cavity formed in a mold for compression molding, and an oscillator mounted on the shoe box for oscillating the shoe box.

In order to effectively oscillate the powder in the shoe box, a plurality of top- and bottom-open cells are preferably provided in the shoe box at its lower portion.

By feeding powder from the shoe box into the cavity of the mold, while vibrating the shoe box, the vibration of the shoe box is transmitted through the powder in the shoe box to the powder in the cavity, so that the density of the powder in the cavity increases.

If the density of the powder in the cavity is at a valve at least 1.1 times the apparent density, the value is close to the upper limit, so that the density of the powder is made sufficiently uniform. If this value is less than 1.1 times the apparent density, a variation in density, i.e. a difference between the maximum and minimum densities of the powder, will increase.

DETAILED DESCRIPTION OF THE PREFERRED EMBODIMENT

Figure 1:
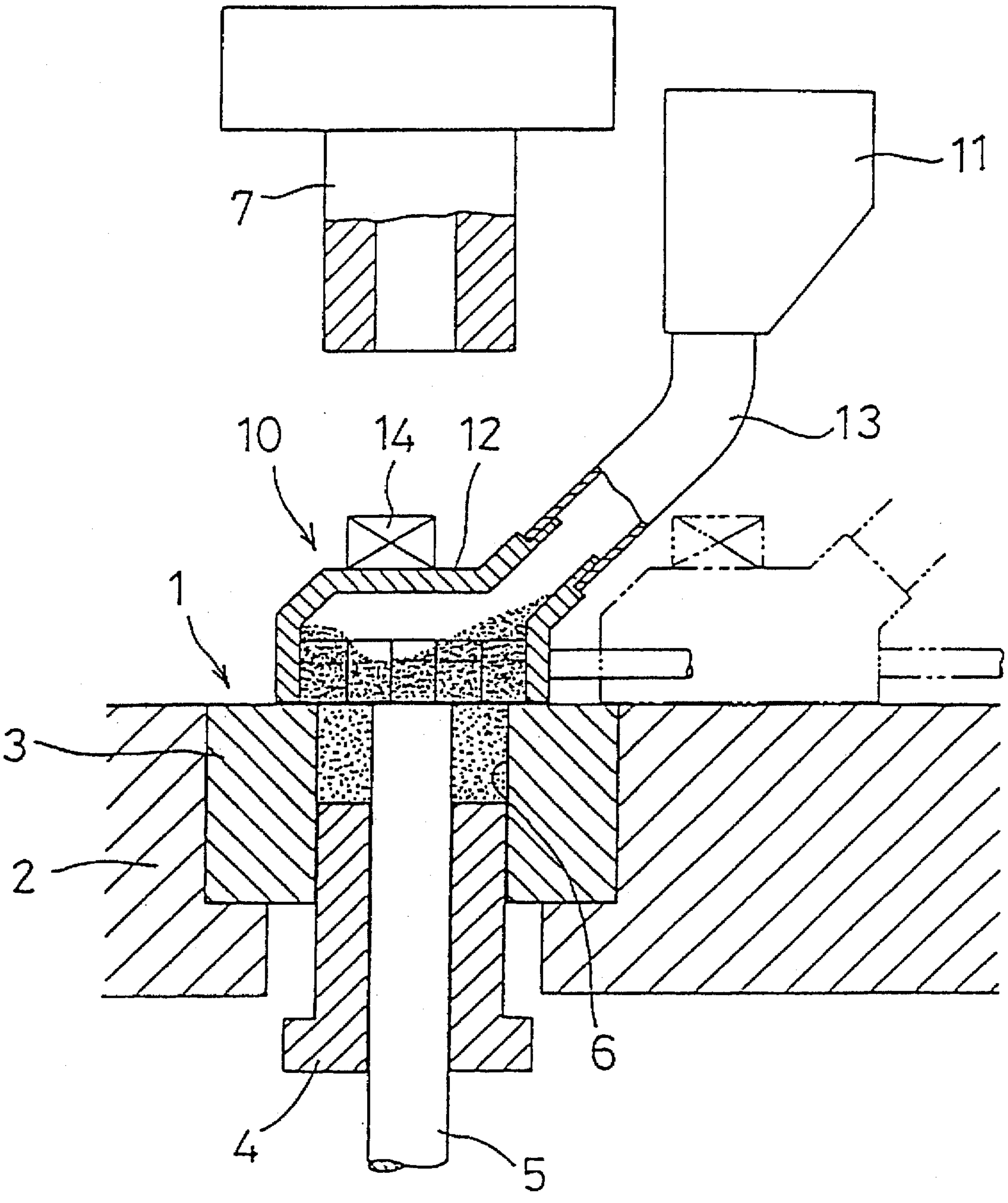
FIG. 1 is a schematic view of a device for use in the manufacturing method according to this invention.
Figure 2:
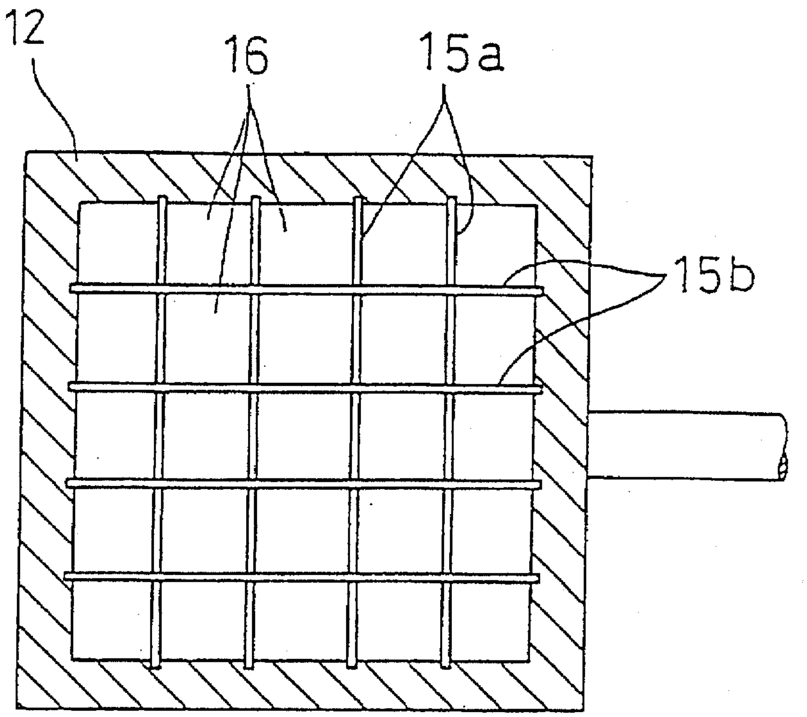
FIG. 2 is a plan view in cross-section of the shoe box of the same.
Figure 3:
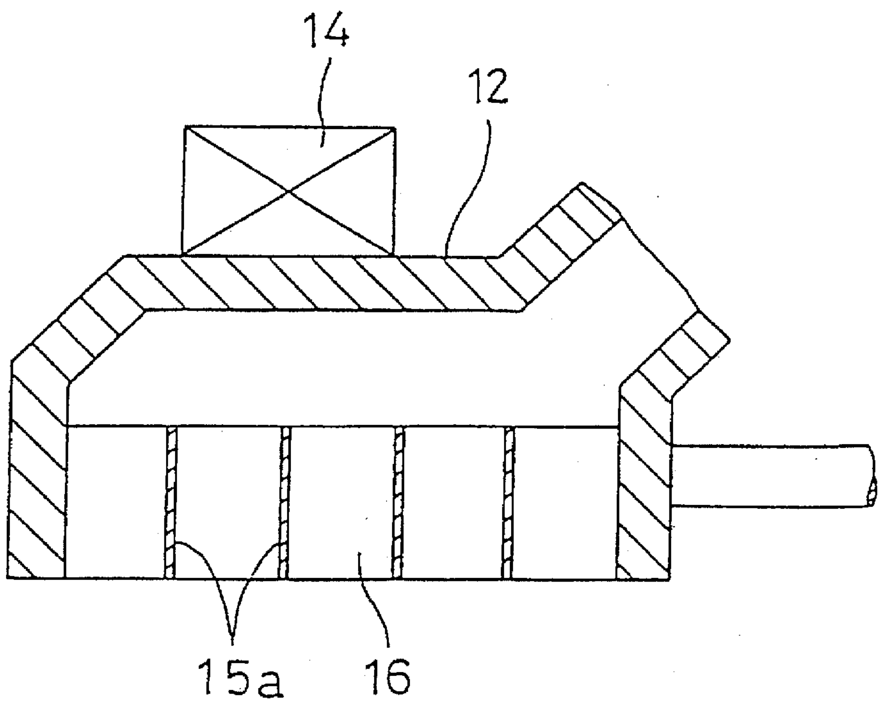
FIG. 3 is a vertical sectional front view of FIG. 2.

FIGS. 1–3 show an embodiment of this invention.

FIG. 1 shows a device for manufacturing a powder molding. It comprises a mold 1 and a powder feeder 10 for feeding powder into the mold 1.

The mold 1 comprises an elevatable die holder 2, a die 3 supported on the die holder 2, a cylindrical lower punch 4 inserted in the die 3, a core rod 5 inserted in the lower punch 4, and an upper punch 7 adapted to be lowered into a cavity 6 defined over the lower punch 4.

The powder feeder 10 comprises a hopper 11 filled with a material powder, and a powder feed shoe box 12 slidable on the die holder 2 and connected to the hopper 11 through a flexible hose 13.

The shoe box 12 is moved toward and away from the cavity 6 of the mold 1. It carries an oscillator 14.

The oscillator 14 may be pneumatic, activated by air pressure, or electric. But the pneumatic type is preferable because it produces less noise and is less expensive.

FIGS. 2 and 3 show the detailed structure of the powder feed shoe box 12. It has an opening at its bottom. The lower part of the interior of the shoe box 12 is partitioned by a plurality of partitioning plates **15*a* and 15*b* that intersect with each other at a right angle into a plurality of cells 16** whose tops and bottoms are open.

The oscillation of the shoe box 12 induced by the oscillator 14 travels through the partitioning plates **15*a*, 15*b* to the powder in the box. If the cells 16 are too large, it is impossible to effectively oscillate the powder. If too small, the cells may be clogged with powder due to the friction between the plates 15*a*, 15*b*** and the powder.

Thus, each cell 16 should be sized so that the distance from its center to the inner surface of the partitioning plates **15*a*, 15*b*** will be between 0.5 mm and 20 mm.

The cells 16 may have a square section as shown, or may be cylindrical, or may be of any other desired shape.

When the shoe box 12 is moved to right over the cavity 6 of the mold 1, the powder in the hopper 11 flows through the hose into the shoe box 12. Then, it flows through the cells 16 and the bottom opening of the box 12, and drops into the cavity 6 by gravity.

While the powder is being fed into the cavity, the shoe box 12 is oscillated by activating the oscillator 14.

The oscillation of the shoe box 12 is transmitted to the powder in the cells 16 and then to the powder in the cavity 6.

By oscillating the powder while feeding it into the cavity, it is possible to increase the density of the powder in the cavity. By increasing its density to 110% or more of the apparent density, it approaches its limit, so that the density of the powder in the cavity is made uniform.

If the oscillator 14 is oscillated at a frequency lower than 10 Hz, it will take a long time to feed powder uniformly into the cavity. If higher than 200 Hz, the amplitude of oscillation would decrease to such an extent that the powder can hardly follow oscillation. This makes it impossible to fill the cavity with powder with sufficient density.

For the foregoing reason, the oscillator 14 should be oscillated at frequencies between 10 Hz and 200 Hz.

If the oscillating pressure is less than 1 kg, it is impossible to sufficiently oscillate the powder in the shoe box 12, so that it will take a long time until the density of the powder in the cavity 6 becomes sufficiently uniform. If larger than 50 kg, the amplitude of vibration will increase to such an extent that the powder moves so violently that it cannot be fed into the cavity by gravity. Also, the amount of wear due to the oscillation of the shoe box 12 increases with the amplitude of oscillation. Thus, too large an amplitude of vibration can shorten the life of the shoe box 12, posing an economic problem. The vibration pressure should therefore be about 1–50 kg.

If the oscillating time per cycle exceeds 10 seconds, the powder molding time will increase. This increases the cost of mass-production. Thus, the oscillating time per cycle should not exceed 10 seconds.

After feeding powder into the cavity in the above-described manner, the shoe box 12 is backed, and then the upper punch 7 is lowered to compress the powder in the cavity 6 for molding.

Now description is made of experiments of methods of manufacturing powder moldings using the powder feeder according to this invention.

Experiment 1

Pure iron powder having an average grain diameter of 100 μm was put into the hopper 11 shown in FIG. 1, so as to feed it into the shoe box 12 through the hose 13.

In this state, the shoe box 12 was moved over the cavity 6 of the mold 1, and simultaneously the oscillator 14 was activated to feed the powder into the cavity 6 while oscillating the powder.

The shoe box 12 used had a 110-by-110 mm regular square section with no partitioning plates **15*a*, 15*b*** provided inside.

The mold 1 used had a ring-shaped cavity 6 having an outer diameter of 40 mm and an inner diameter of 27 mm.

The oscillator 14 used was a pneumatic type. It was operated at an oscillating frequency of 30Hz and a vibrating pressure of 10 kg for 5 seconds per cycle.

After filling the cavity with powder, the upper punch 7 was lowered to compress the powder in the cavity at a pressure of 6 tons/cm$^2$. Then, the compression-molded article was taken out by lowering the die holder 2. The amount of powder packed and variation in density were measured. The results are shown in Table 1.

As a comparative example, we also prepared a compression-molded article which was formed by feeding powder into the cavity 6 while not oscillating the shoe box 12, and compressing it. The results of measurements of the comparative example are also listed in Table 1.

The "Variation in molding density" was obtained by diametrically dividing each article into eight segments, measuring the densities for the respective segments, and subtracting the minimum one of the eight density values from the maximum one.

TABLE 1

| | Amount of powder packed | Variation in molding density |
|---|---|---|
| Molding 1 | 43.1 g | 0.11 g/cm$^3$ |
| Comparative article | 39.0 g | 0.20 g/cm$^3$ |

It is apparent from Table 1 that the article formed according to the method of the invention was more than 10% higher in the amount of powder packed than the comparative article and that this fact means lower variation in density.

Experiment 2

Powder moldings were formed in the same manner as in Experiment 1, using shoe boxes 12 having partitioning plates **15*a* and 15*b* arranged at intervals of 40 mm, 30 mm, 10 mm and 1 mm. We measured the amount of powder packed and variation in molding density for Articles 2, 3, 4, and 5 which were formed using the shoe boxes 12** having their partitioning plates arranged at intervals of 40 mm, 30 mm, 10 mm and 1 mm, respectively. The results are shown in Table 2.

TABLE 2

| | Amount of powder packed g | Variation in molding density g/cm$^3$ | Distance from center of opening to inner wall of pertitioning plate (mm) |
|---|---|---|---|
| Molding 2 | 43.3 | 0.10 | 20 |
| Molding 3 | 44.5 | 0.06 | 15 |
| Molding 4 | 45.1 | 0.04 | 5 |
| Molding 5 | 39.5 | 0.25 | 0.5 |

As is apparent from Table 2, the measurement results for Article 2 differ little from those for Article 1. This is because the partitioning plates **15*a*, 15*b*** were arranged too far apart from each other.

In contrast, Articles 3 and 4 achieved marked improvements both in the amount of powder packed and variation in density. Article 5, which was formed with the Partitioning plates 15*a*, 15*b* arranged too close to each other, was low in the amount of powder packed and high in variation in density.

Experiment 3

Powder moldings were formed using a shoe box having its partitioning plates 15*a*, 15*b* arranged at intervals of 10 mm in the same way as in Experiment 1 except that the oscillating frequency and oscillating pressure were changed. We measured the variation in molding density for each powder molding obtained.

Figure 4:
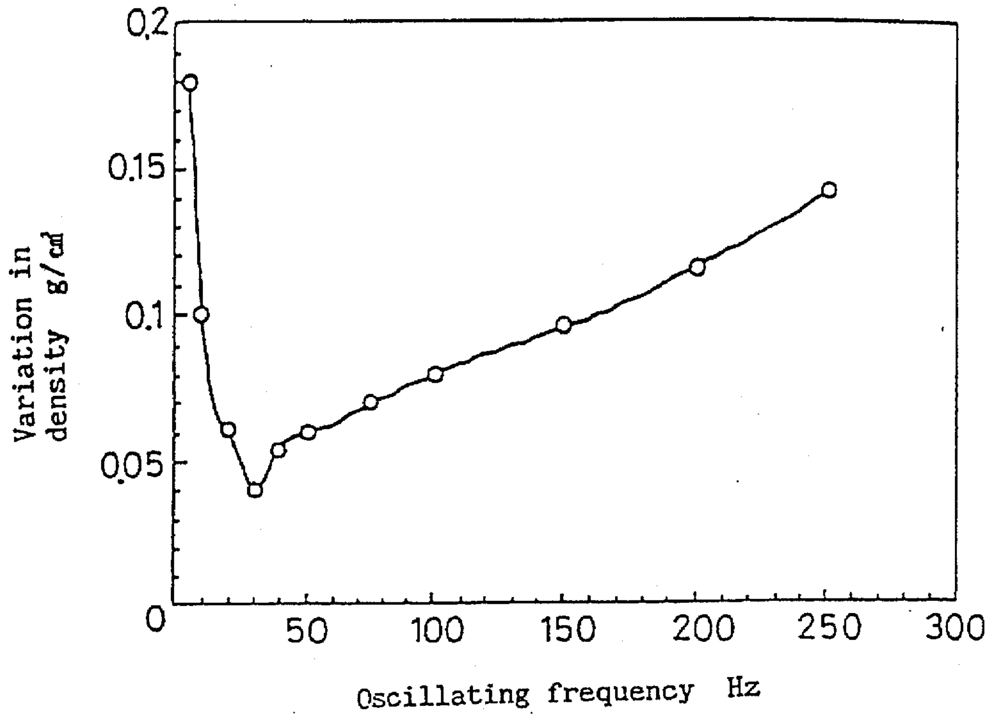
FIG. 4 is a graph showing the relationship between the oscillating frequency applied to the material powder and the variation in density of the article formed by the method of the present invention.

As shown in FIG. 4, the variation in density was too large at oscillating frequencies of less than 10 Hz or more than 200 Hz, and the smallest at frequencies near 30 Hz.

Figure 5:
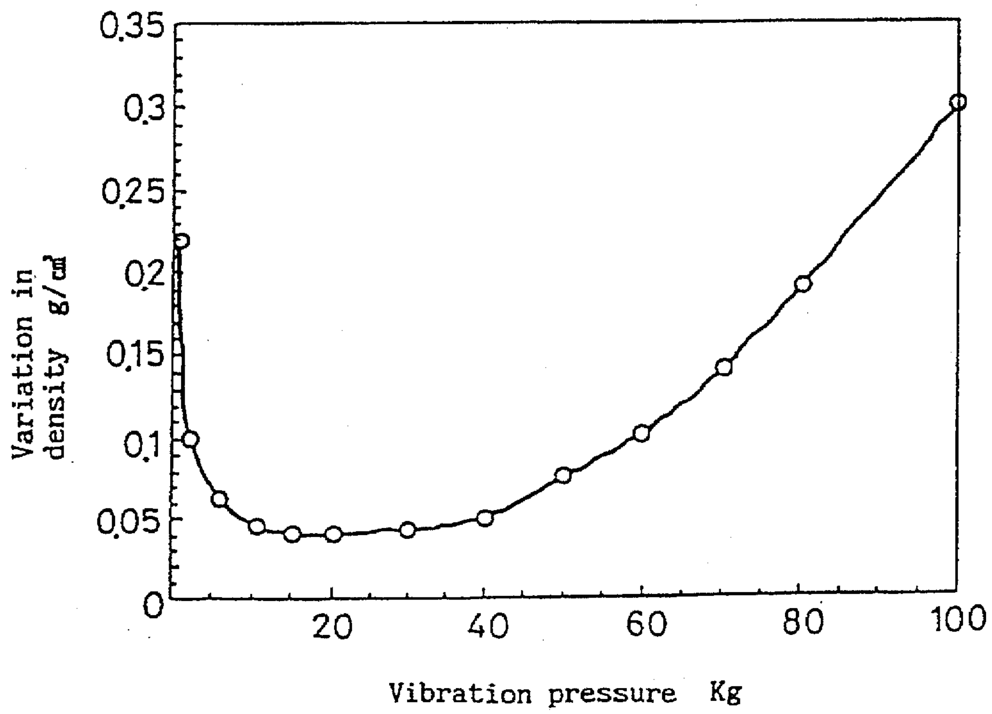
FIG. 5 is a graph showing the relationship between the oscillating pressure applied to the material powder and the variation in density of the article formed by the method of the present invention.
Figure 6:
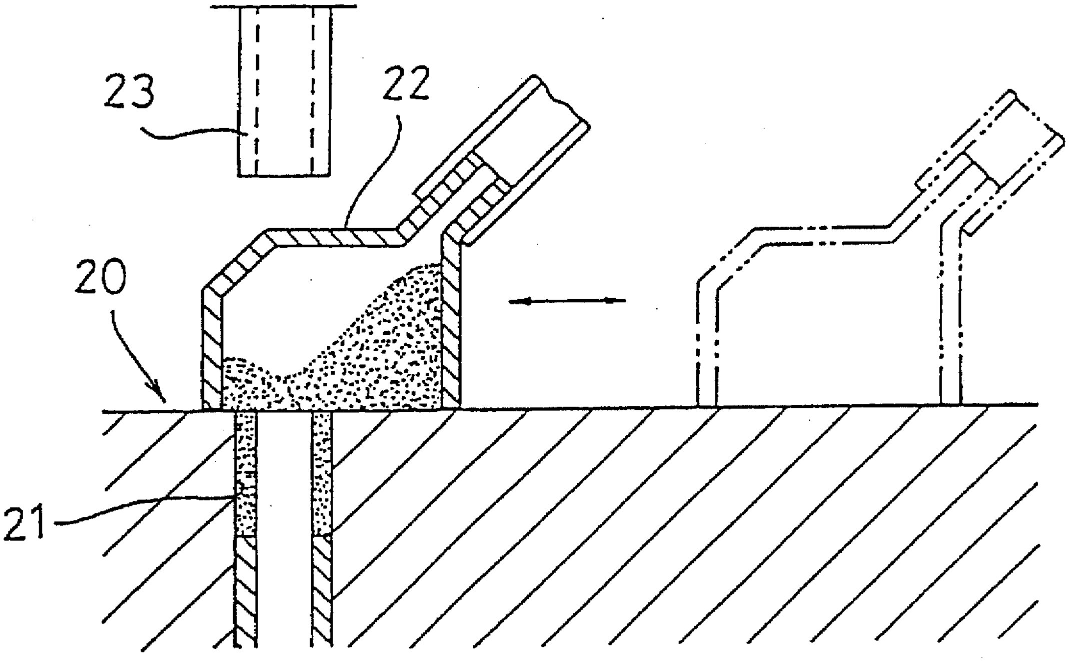
Fig. 6 PRIOR ART
FIG. 6 is a schematic view of a conventional device for use in the manufacture of powder moldings.

As will be apparent from FIG. 5, where the oscillating pressure was less than 1 kg, it was impossible to oscillate the powder sufficiently, so that the variation in density was large. Also, where the vibration pressure was higher than 50 kg, the variation in density increased due to too large, an oscillating amplitude.

Industrial Application

According to this invention, a material powder is fed into the cavity of the mold while oscillating the shoe box. The powder is thus packed with uniform and high density. The article formed by compressing the powder in the cavity shows excellent properties.

Since only the shoe box is oscillated, the mold is less likely to be damaged. Also, with this arrangement, it is possible to use practically any kind of material powder.

By providing a plurality of mutually partitioned cells in the shoe box, vibration of the shoe box can be effectively transmitted to the powder in the shoe box, so that it is possible to pack powder uniformly in the cavity to a high level of density in a short time.

We claim:

1. A method of manufacturing a powder molding, comprising the steps of:

feeding a material powder from a shoe box through a bottom of the shoe box into a cavity formed in a mold while oscillating the material powder at an oscillation frequency of 10–200 Hz and at an oscillation pressure of 1–50 kg such that the density of the powder in the cavity becomes at least 1.1 times the apparent density; and compressing the powder in the cavity.

2. The method of claim 1, wherein said step of feeding comprises moving the shoe box over the cavity, and wherein said step of compressing comprises lowering a punch into said cavity after moving said shoe box away from said cavity.

3. The method of claim 1, wherein the shoe box has an oscillator mounted thereto.

4. A powder feeder for use in manufacturing a powder mold, comprising:

a mold part having a cavity for compression molding; and a shoe box mounted so as to be movable toward and away from said cavity, said shoe box having a lower portion provided with a plurality of cells having open tops and bottoms, said cells each comprising a space defined in said lower portion by a plurality of vertical partitioning plates; and an oscillator mounted on said shoe box.

5. The powder feeder of claim 4, wherein said shoe box is connected to a powder hopper by a flexible hose.

6. The powder feeder of claim 4, wherein said mold part comprises a punch adapted to be lowered into said cavity.

7. The powder feeder of claim 4, wherein said mold part comprises an upper surface, said cavity opening onto said upper surface, and wherein said shoe box is movable along said upper surface between a position over said cavity and a position in which said cavity is uncovered by said shoe box.

* * * * *